(12) United States Patent
Tsai et al.

(10) Patent No.: US 7,688,171 B2
(45) Date of Patent: Mar. 30, 2010

(54) TRANSFORMER AND RECTIFIER CIRCUIT USING SUCH TRANSFORMER

(75) Inventors: Sheng-Nan Tsai, Taoyuan Hsien (TW); Shun-Tai Wang, Taoyuan Hsien (TW); Hung-Yu Tseng, Taoyuan Hsien (TW); Ching-Hsien Teng, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 12/199,947

(22) Filed: Aug. 28, 2008

(65) Prior Publication Data

US 2009/0309684 A1 Dec. 17, 2009

(30) Foreign Application Priority Data

Jun. 13, 2008 (TW) ............................. 97122223 A

(51) Int. Cl.
*H01F 27/29* (2006.01)
(52) U.S. Cl. .................................................. 336/192
(58) Field of Classification Search .................. 336/65, 336/83, 170, 180–184, 196, 198, 212, 214–215, 336/220–225, 192
See application file for complete search history.

(56) References Cited

U.S. PATENT DOCUMENTS

| | | | |
|---|---|---|---|
| 6,211,767 B1 * | 4/2001 | Jitaru | 336/200 |
| 7,414,510 B1 * | 8/2008 | Cheng | 336/200 |
| 7,498,921 B1 * | 3/2009 | Wang | 336/200 |
| 2008/0180205 A1 * | 7/2008 | Tsai et al. | 336/192 |

* cited by examiner

*Primary Examiner*—Tuyen Nguyen
(74) *Attorney, Agent, or Firm*—Kirton & McConkie; Evan R. Witt

(57) ABSTRACT

A transformer includes a primary winding coil, a winding frame member, multiple first three-dimensional conductive pieces, a second three-dimensional conductive piece, a magnetic core assembly and a fixing plate. The winding frame member includes a first winding frame and a second winding frame for winding the primary winding coil thereon. The first three-dimensional conductive pieces are respectively sheathed around the first winding frame and the second winding frame of the winding frame member. The second three-dimensional conductive piece is arranged between the first three-dimensional conductive pieces. The magnetic core assembly is partially embedded into the first three-dimensional conductive pieces, the first winding frame, the second winding frame and the second three-dimensional conductive piece. The fixing plate is connected with the first three-dimensional conductive pieces and the second three-dimensional conductive piece so as to fix the first three-dimensional conductive pieces and the second three-dimensional conductive piece.

16 Claims, 6 Drawing Sheets

US 7,688,171 B2

TRANSFORMER AND RECTIFIER CIRCUIT USING SUCH TRANSFORMER

FIELD OF THE INVENTION

The present invention relates to a transformer, and more particularly to a transformer having enhanced heat-dissipating efficiency, reduced cost and small size. The present invention also relates to a rectifier circuit having such a transformer.

BACKGROUND OF THE INVENTION

Switching power converters are used in a wide variety of applications to convert an unregulated power source into various regulated voltage levels by using several switches. For example, a switching DC/DC power converter is used to convert DC power at one voltage level into other regulated DC voltage levels. Such a switching DC/DC power converter usually has a rectifier circuit for rectifying and filtering the input power. For achieving high performance and low power consumption, the rectifier circuit with low voltage but high output current has become a potential candidate to replace the conventional rectifier circuit. For example, a well-known current-doubler rectifier (CDR) circuit has been proposed for use in high frequency DC/DC converter applications.

Although the current-doubler rectifier circuit is effective for reducing power consumption of the DC/DC converter, there are still some drawbacks. The conventional current-doubler rectifier circuit has separate magnetic components, namely a transformer and at least one inductor. In the transformer of the current-doubler rectifier circuit, a coil is wound around a magnetic core assembly to form as a secondary winding assembly. Since the coil is very thin, its surface area is too small and thus the heat-dissipating efficiency of the transformer is unsatisfied. Since the rectifier circuit needs high output current, a great amount of heat will be generated during operation of the DC/DC converter. The drawback of using the coil as the secondary winding assembly becomes more serious if the output current is increased. Due to the separate arrangement of the transformer and the inductor, a lot of layout area of the system circuit board is occupied by the transformer and the inductor. This configuration results in increased size and cost. Furthermore, since the transformer and the inductor are electrically connected with each other through designed trace patterns, the use of the trace patterns increase power loss of the current-doubler rectifier circuit. Under this circumstance, the converting efficiency of the DC/DC converter is usually insufficient.

Therefore, there is a need of providing an improved transformer so as to obviate the drawbacks encountered from the prior art.

SUMMARY OF THE INVENTION

It is an object of the present invention to provide a transformer having enhanced heat-dissipating efficiency, reduced cost and small size.

In accordance with an aspect of the present invention, there is provided a transformer. The transformer includes a primary winding coil, a winding frame member, multiple first three-dimensional conductive pieces, a second three-dimensional conductive piece, a magnetic core assembly and a fixing plate. The winding frame member includes a first winding frame and a second winding frame for winding the primary winding coil thereon. The first three-dimensional conductive pieces are respectively sheathed around the first winding frame and the second winding frame of the winding frame member. The second three-dimensional conductive piece is arranged between the first three-dimensional conductive pieces. The magnetic core assembly is partially embedded into the first three-dimensional conductive pieces, the first winding frame, the second winding frame and the second three-dimensional conductive piece. The fixing plate is connected with the first three-dimensional conductive pieces and the second three-dimensional conductive piece so as to fix the first three-dimensional conductive pieces and the second three-dimensional conductive piece.

In accordance with another aspect of the present invention, there is provided a rectifier circuit. The rectifier circuit includes a transformer of the present invention and an output capacitor. The output capacitor is electrically connected with the second three-dimensional conductive piece of the transformer.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
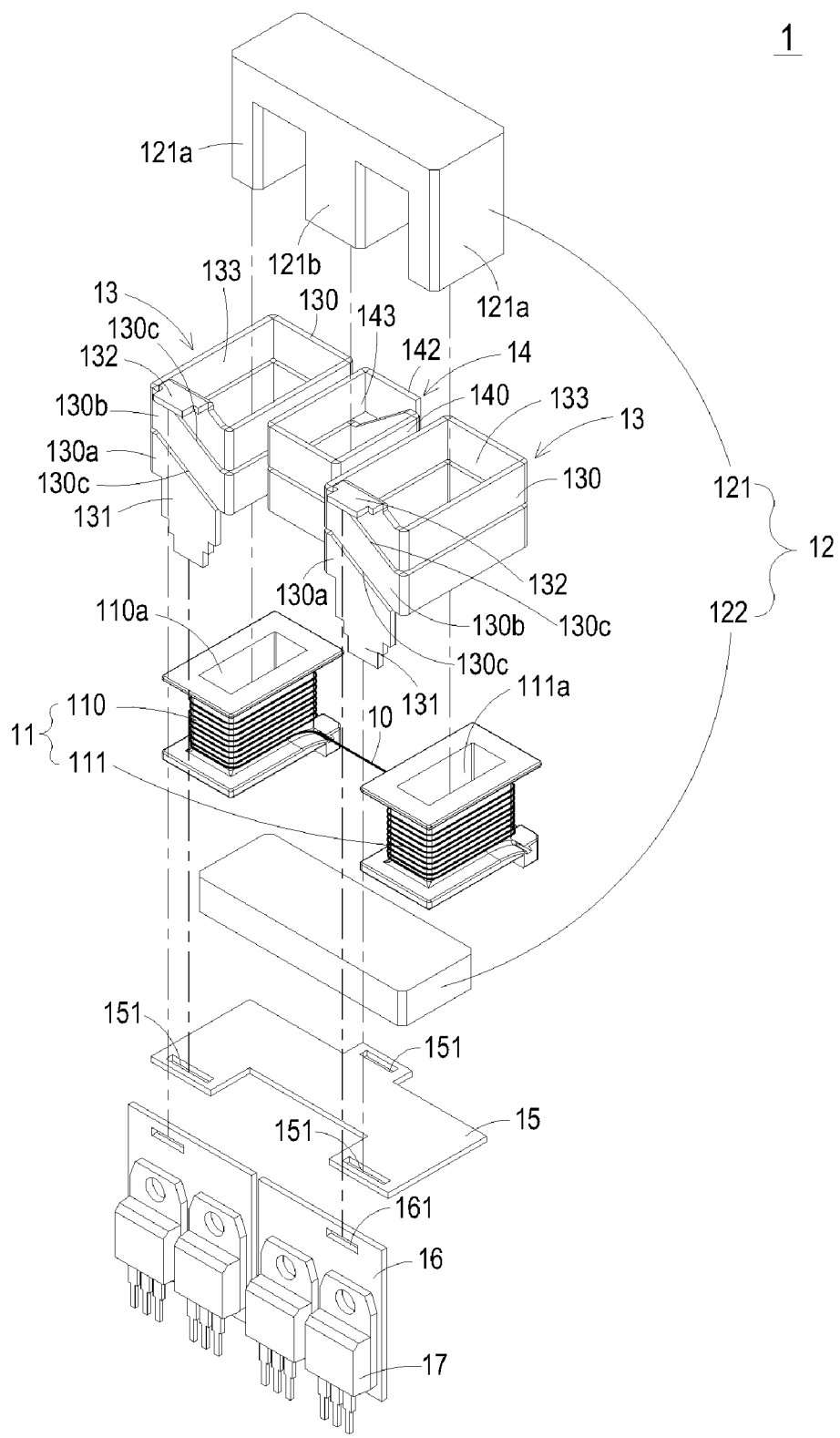
FIG. 1 is a schematic exploded view of a transformer according to a first preferred embodiment of the present invention.
Figure 2:
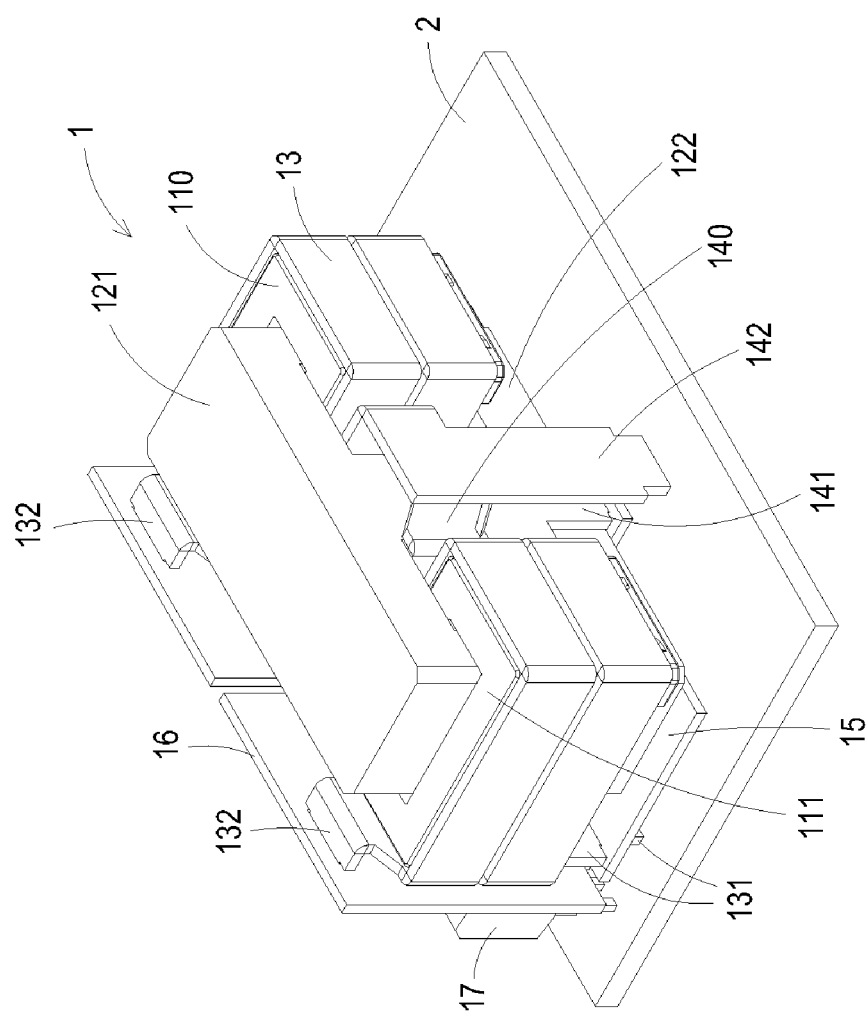
FIG. 2 is a schematic assembled view of the transformer of FIG. 1, which is mounted in a circuit board.
Figure 4:
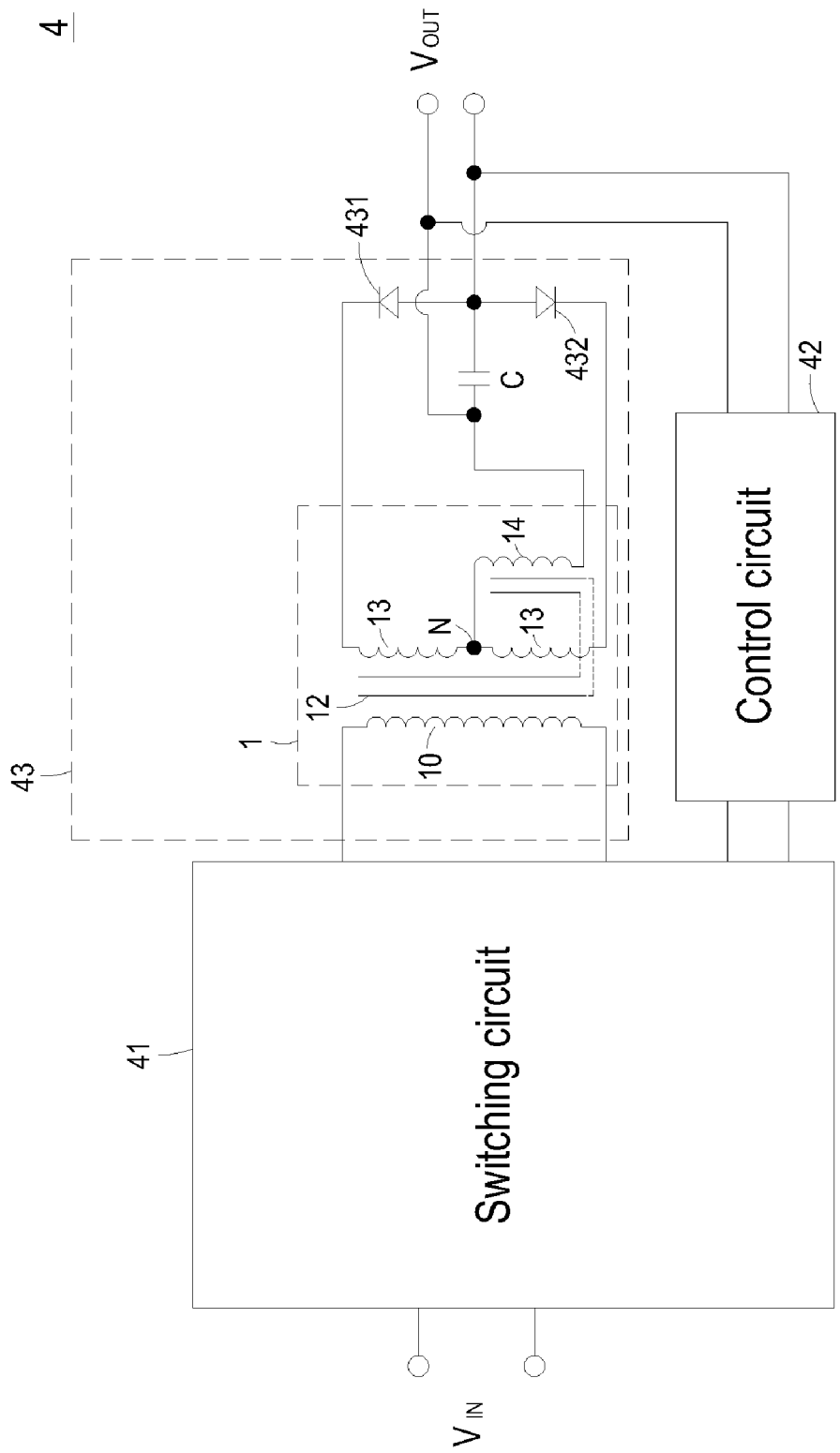
FIG. 4 is a schematic circuit block diagram of a DC/DC power converter using the transformer shown in FIG. 1.

FIG. 1 is a schematic exploded view of a transformer according to a first preferred embodiment of the present invention. FIG. 2 is a schematic assembled view of the transformer of FIG. 1, which is mounted in a circuit board. Please refer to FIGS. 1 and 2. The transformer 1 of the present invention may be used in a current-doubler rectifier circuit as shown in FIG. 4. The transformer 1 principally comprises a primary winding coil 10, a winding frame member 11, a magnetic core assembly 12, multiple first three-dimensional conductive pieces 13, a second three-dimensional conductive piece 14 and a fixing plate 15. The primary winding coil 10 is wound around the winding frame member 11. In this embodiment, the winding frame member 11 comprises two separate winding frames 110 and 111. Consequently, a portion of the primary winding coil 10 is wound around the first winding frame 110, and the other portion of the primary winding coil 10 is wound around the second winding frame 111. The first winding frame 110 and the second winding frame 111 have respective central channels 110a and 111a such that the magnetic core assembly 12 may be partially embedded into the central channels 110a and 111a. In other embodiments, the first winding frame 110 and the second winding frame 111 are integrally formed. In other embodiments, after the primary winding coil 10 is wound around the first winding frame 110 and the second winding frame 111, the primary winding coil 10 is enclosed by a tape (not shown) so as to isolate the primary winding coil 10.

The first three-dimensional conductive pieces 13 collectively define a secondary winding assembly of the transformer 1. In this embodiment, the first three-dimensional conductive pieces 13 are sheathed around the first winding frame 110 and the second winding frame 111 of the winding frame member 11. In other words, the first winding frame 110 and the second winding frame 111 are received within the internal portions of the first three-dimensional conductive pieces 13. Each of the first three-dimensional conductive pieces 13 is formed by turning a copper slice for multi-loops. For example, a first three-dimensional conductive piece 13 is a three-dimensional structure comprising a first main body 130, a first connecting part 131, a second connecting part 132 and a first receiving part 133. The first receiving part 133 is used to accommodate the first winding frame 110 or the second winding frame 111 of the winding frame member 11. The first connecting part 131 is extended downwardly from a lower terminal of the first main body 130 and parallel with the length direction of the first receiving part 133. The second connecting part 132 is extended horizontally and externally from an upper terminal of the first main body 130. The first connecting part 131 and the second connecting part 132 are not coplanar. In some embodiments, each of the first three-dimensional conductive pieces 13 is turned for two loops such that a gap is formed between these two loops. Furthermore, these two loops are connected with each other through an intermediate part 130b, which is arranged on the same plane with the first connecting part 131 of the first three-dimensional conductive piece 13. In some embodiments, a sidewall of the intermediate part 130b has a slant surface 130c. Due to this configuration, all loops will not be entangled with each other so as to compact the overall volume of the first three-dimensional conductive piece 13. It is of course that each of the first three-dimensional conductive pieces 13 may be turned for more than two loops. Like the first three-dimensional conductive piece 13, the second three-dimensional conductive piece 14 is turned for two or more loops.

The magnetic core assembly 12 of the transformer 1 includes a first magnetic part 121 and a second magnetic part 122, which are cooperatively formed as an EI-type core assembly. The first magnetic part 121 (E-type) and the second magnetic part 122 (I-type) are disposed on opposite sides of the winding frame member 11 and the first three-dimensional conductive pieces 13. In addition, two leg parts 121a of the first magnetic part 121 are embedded into the central channel 110a of the first winding frame 110 and the central channel 111a of the second winding frame 111. As a result, the primary winding coil 10 and the first three-dimensional conductive piece 13 interact with the magnetic core assembly 12 to achieve the purpose of voltage regulation.

Figure 3:
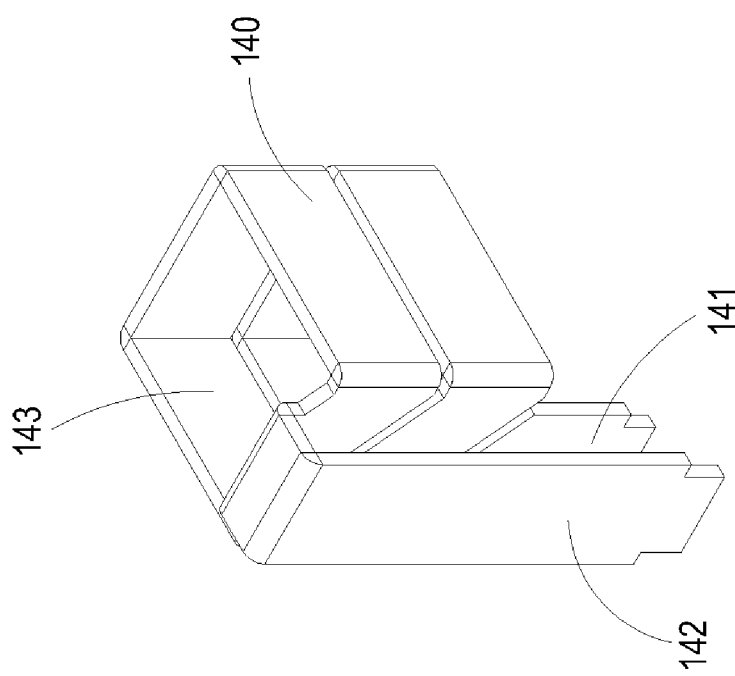
FIG. 3 is a schematic perspective view illustrating a variation of the second three-dimensional conductive piece.

The second three-dimensional conductive piece 14 is arranged between the multiple first three-dimensional conductive pieces 13. The middle part 121b of the first magnetic part 121 is embedded into the second receiving part 143 of the second three-dimensional conductive piece 14. As a result, the second three-dimensional conductive piece 14 interacts with the middle part 121b of the first magnetic part 121 to achieve the purpose of an inductor. The second three-dimensional conductive piece 14 is formed by turning a copper slice for multi-loops. The second three-dimensional conductive piece 14 is a three-dimensional structure comprising a second main body 140, a third connecting part 141 (as shown in FIG. 2), a fourth connecting part 142 and a second receiving part 143 (as shown in FIG. 3). The second receiving part 143 is defined by enclosing the second main body 140 for accommodating the middle part 121b of the first magnetic part 121. The third connecting part 141 is extended downwardly from a lower terminal of the second main body 140 and parallel with the length direction of the second receiving part 143. The fourth connecting part 142 is extended from an upper edge of the second main body 140 and then extended downwardly such that the fourth connecting part 142 is substantially parallel with the third connecting part 141 and spaced from the third connecting part 141 by a gap. In some embodiments, the second three-dimensional conductive piece 14 is turned for two loops. It is of course that the second three-dimensional conductive piece 14 may be turned for more than two loops as required.

It is noted that, however, those skilled in the art will readily observe that numerous modifications and alterations of the second three-dimensional conductive piece 14 may be made while retaining the teachings of the invention. For example, as shown in FIG. 3, the fourth connecting part 142 is extended horizontally and externally from an upper terminal of the second main body 140 and then extended downwardly such that the fourth connecting part 142 is substantially parallel with the third connecting part 141 and spaced from the third connecting part 141 by a gap.

Please refer to FIGS. 1 and 2 again. The fixing plate 15 is disposed adjacent to the second magnetic part 122 of the magnetic core assembly 12. The fixing plate 15 is made of conductive material such as copper. The fixing plate 15 has several perforations 151 corresponding to the first connecting parts 131 of the first three-dimensional conductive pieces 13 and the third connecting part 141 of the second three-dimensional conductive piece 14. After the first connecting parts 131 and the third connecting part 141 are inserted into the perforations 151, the first three-dimensional conductive pieces 13 and the second three-dimensional conductive piece 14 are fixed on the fixing plate 15. As a result, the first three-dimensional conductive pieces 13 and the second three-dimensional conductive piece 14 are electrically coupled with each other through the fixing plate 15.

The locations of the perforations 151 and the shape of the fixing plate 15 may be varied as required. Alternatively, the first three-dimensional conductive pieces 13 and the second three-dimensional conductive piece 14 may be fixed on the fixing plate 15 by screwing or fastening.

In some embodiments, the transformer 1 further comprises at least one auxiliary plate 16 for facilitating supporting an electronic component 17 (e.g. a transistor or a diode) and removing heat generated from the electronic component 17. The auxiliary plate 16 has several engaging holes 161 corresponding to the second connecting parts 132 of the first three-dimensional conductive pieces 13. After the second connecting parts 132 of the first three-dimensional conductive pieces 13 are inserted into the engaging holes 161 of the auxiliary plate 16, the auxiliary plate 16 is fixed on the first three-dimensional conductive pieces 13. The auxiliary plate 16 is also made of conductive material such as copper. As a result, the electronic component 17 is electrically connected with the transformer through the auxiliary plate 16.

Please refer to FIG. 2 again. The transformer 1 is mounted on a circuit board 2 in an upright arrangement. The circuit board 2 has several slots (not shown) corresponding to the first connecting parts 131 of the first three-dimensional conductive pieces 13 and the fourth connecting part 142 of the second three-dimensional conductive piece 14. After the first connecting parts 131 and the fourth connecting part 142 are inserted into corresponding slots, the transformer 1 is fixed on the circuit board 2.

From the above description, since each of the first three-dimensional conductive pieces 13 is formed by turning a copper slice for multi-loops, the surface area of the three-dimensional conductive piece 13 is very large. Due to the very large surface area of the three-dimensional conductive piece 13, the transformer 1 may be operated at high output current with a desired heat-dissipating efficiency.

FIG. 4 is a schematic circuit block diagram of a DC/DC power converter using the transformer shown in FIG. 1. Please refer to FIGS. 1, 2 and 4. The DC/DC power converter 4 comprises an input terminal $V_{IN}$, a switching circuit 41, a control circuit 42, a rectifier circuit 43 and an output terminal $V_{OUT}$. A DC voltage is inputted into the DC/DC power converter 4 through the input terminal $V_{IN}$. An example of the rectifier circuit includes but is not limited to a current-doubler rectifier (CDR) circuit. The switching circuit 41 is electrically connected to the input terminal $V_{IN}$, the CDR circuit 43 and the control circuit 42 for receiving the DC voltage through the input terminal $V_{IN}$. Under control of the control circuit 42, the switching circuit 41 provides a pulse width modulated voltage to the CDR circuit 43. In some embodiments, the switching circuit 41 comprises multiple switch elements (not shown). For example, the switching circuit 41 comprises two switch elements to have a half-bridge topology or comprises four switch elements to have a full-bridge topology. The control circuit 42 is electrically connected to the switching circuit 41, the CDR circuit 43 and the output terminal $V_{OUT}$. The control circuit 42 may detect the voltage at the output terminal $V_{OUT}$ and control operations of the multiple switch elements of the switching circuit 41.

By the CDR circuit 43, the pulse width modulated voltage issued from the switching circuit 41 is subject to voltage conversion, rectification and filtering and then outputted through the output terminal $V_{OUT}$. In this embodiment, the CDR circuit 43 comprises an output capacitor C, two rectifiers 431, 432 and a transformer 1.

The transformer 1 has a configuration as shown in FIG. 1. The transformer 1 comprises a primary winding coil 10, a magnetic core assembly 12, multiple first three-dimensional conductive pieces 13 and a second three-dimensional conductive piece 14. The first three-dimensional conductive pieces 13 are used as a secondary winding assembly. The second three-dimensional conductive piece 14 is used as an inductor. The primary winding coil 10 is electrically connected to the switching circuit 41 for receiving the pulse width modulated voltage issued from the switching circuit 41. The primary winding coil 10, the first three-dimensional conductive piece 13 and the second three-dimensional conductive piece 14 interact with the magnetic core assembly 12 to achieve the purpose of voltage regulation. The first three-dimensional conductive pieces 13 are electrically connected to the rectifiers 431 and 432 and induced by the primary winding coil 10, thereby generating an induced current. The induced current is also rectified by the rectifiers 431 and 432. The second three-dimensional conductive piece 14 is electrically connected to the output capacitor C. The second three-dimensional conductive piece 14 and the output capacitor C collectively define a filter for filtering the regulated voltage issued from the transformer 1. The filtered regulated voltage is outputted through the output terminal $V_{OUT}$.

In the above embodiments, the first three-dimensional conductive pieces 13 and the second three-dimensional conductive piece 14 are fixed on the fixing plate 15, which is made of copper. As a result, the first three-dimensional conductive pieces 13 and the second three-dimensional conductive piece 14 are electrically coupled with each other through the fixing plate 15. Therefore, as shown in FIG. 4, the first three-dimensional conductive pieces 13 and the second three-dimensional conductive piece 14 are coupled to a node N. Examples of the rectifiers 431 and 432 include but are not limited to diodes or MOSFETs. Moreover, the rectifiers 431 and 432 may be mounted on the auxiliary plate 16 along with the electronic component 17.

Since the second three-dimensional conductive piece 14 interacts with the magnetic core assembly 12 to achieve the purpose of an inductor, the second three-dimensional conductive piece 14 is used as an inductor of the CDR circuit 43. That is, the second three-dimensional conductive piece 14 and the output capacitor C may collectively define a filter. Under this circumstance, no additional trace pattern is required to connect the transformer 1 and the inductor (i.e. the second three-dimensional conductive piece 14) so as to reduce power loss, cost and overall size. When the CDR circuit 43 is used in the DC/DC power converter 4, the converting efficiency is satisfactory.

Figure 5:
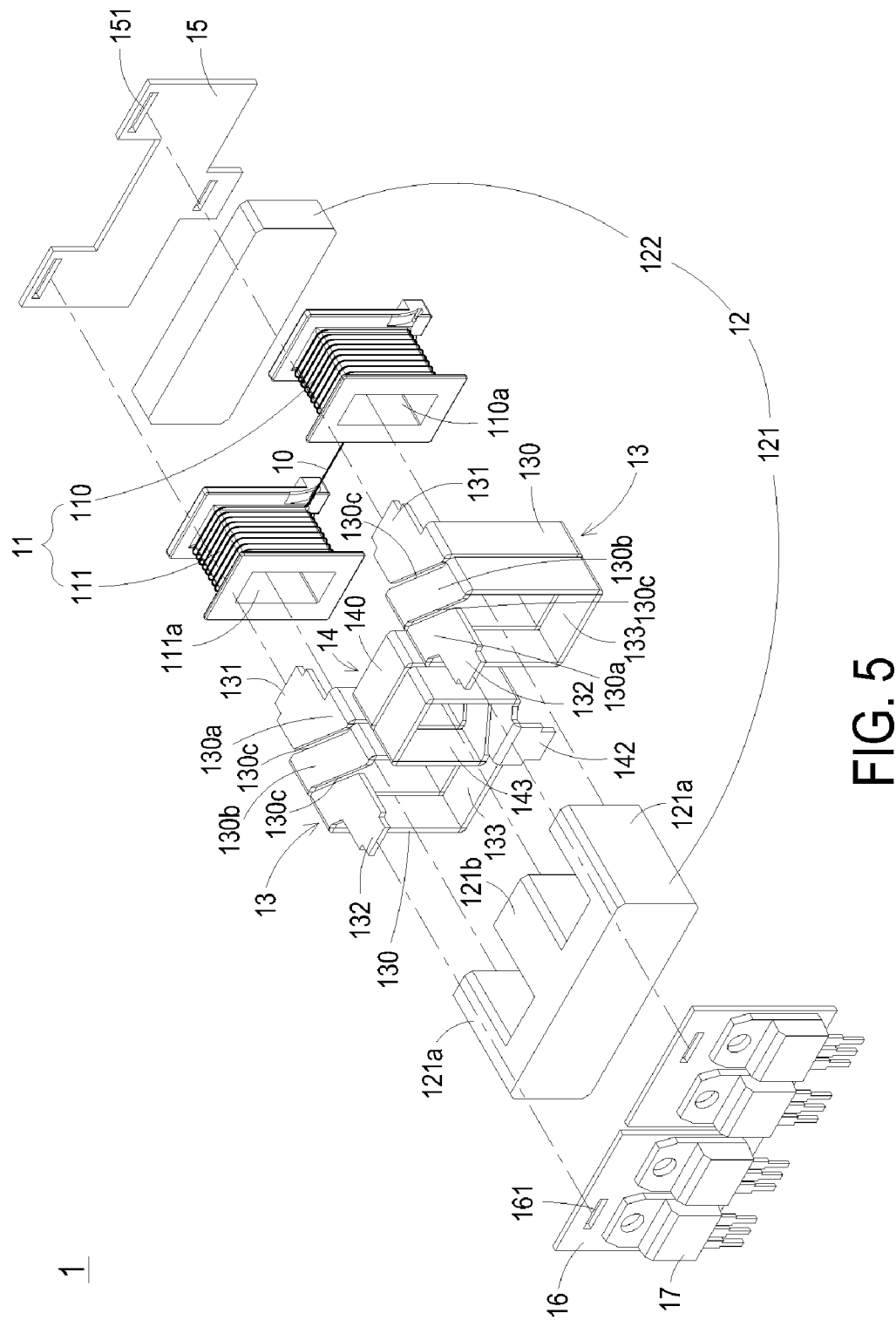
FIG. 5 is a schematic exploded view of a transformer according to a second preferred embodiment of the present invention.
Figure 6:
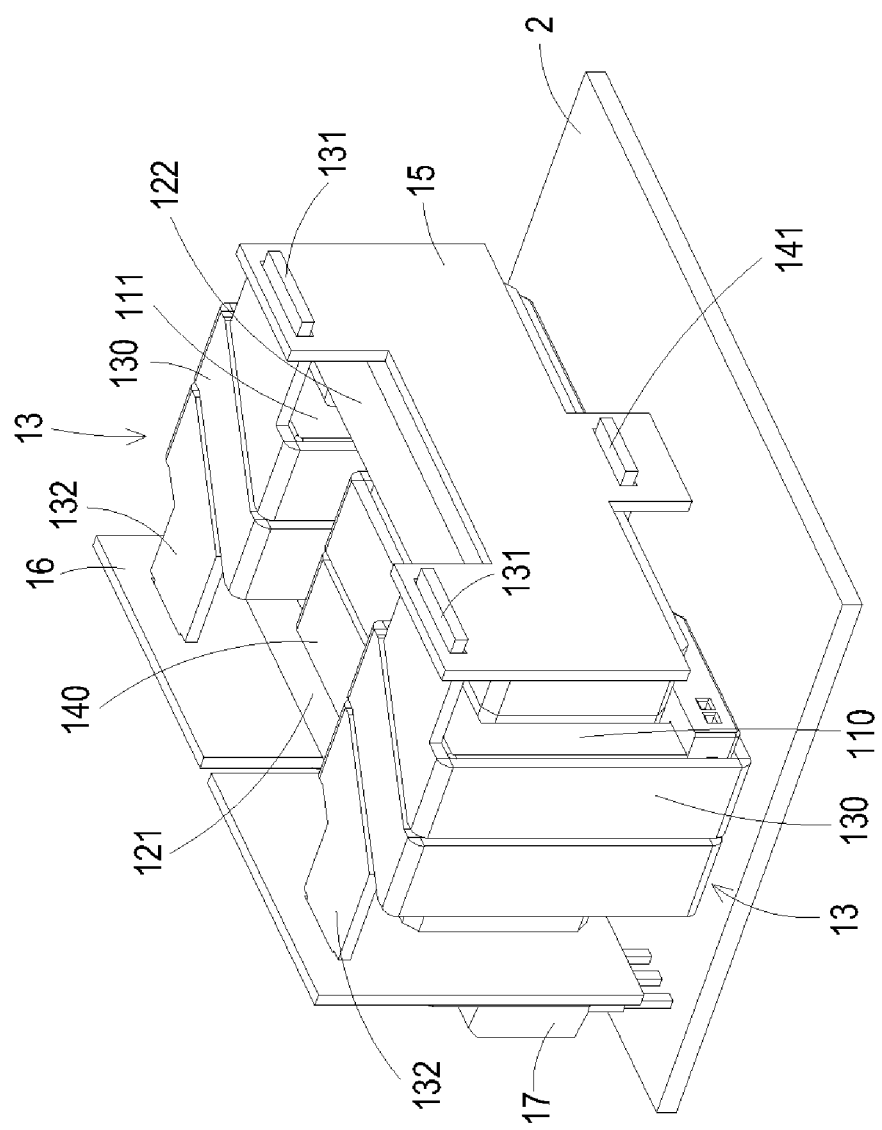
FIG. 6 is a schematic assembled view of the transformer of FIG. 5, which is mounted in a circuit board.

FIG. 5 is a schematic exploded view of a transformer according to a second preferred embodiment of the present invention. FIG. 6 is a schematic assembled view of the transformer of FIG. 5, which is mounted in a circuit board. Please refer to FIGS. 5 and 6. The functions of the components included in the transformer of this embodiment are identical to those shown in FIGS. 1 and 2, and are not redundantly described herein. Except for the auxiliary plate 16 and the electronic component 17, the transformer 1 of this embodiment is mounted on the circuit board 2 in a horizontal arrangement in order to comply with different space configurations. In addition, the second connecting part 132 of the first three-dimensional conductive piece 13 is coplanar with the first connecting part 131 and parallel with the circuit board 2. In addition, the fourth connecting part 142 of the second three-dimensional conductive piece 14 is perpendicular to the third connecting part 141. After the second connecting parts 132 of the first three-dimensional conductive pieces 13 are inserted into the engaging holes 161 of the auxiliary plate 16, the auxiliary plate 16 is fixed on the first three-dimensional conductive pieces 13 and adjacent to the first magnetic part 121 of the magnetic core assembly 12. After the first connecting parts 131 and the fourth connecting part 142 are inserted into corresponding slots, the transformer 1 is fixed on the circuit board 2.

From the above description, the transformer and the rectifier circuit of the present invention have enhanced heat-dissipating efficiency because the surface area of the secondary winding assembly is increased by using the first three-dimensional conductive pieces as the secondary winding assembly. Moreover, since the second three-dimensional conductive piece interacts with the magnetic core assembly 12 to achieve the purpose of an inductor, no additional trace pattern is required to connect the transformer with the inductor. Consequently, the power loss, the cost and the size of the rectifier current are reduced. When the rectifier circuit is used in the DC/DC power converter, the converting efficiency is satisfactory.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transformer comprising:
    a primary winding coil;
    a winding frame member comprising a first winding frame and a second winding frame for winding said primary winding coil thereon;
    multiple first three-dimensional conductive pieces respectively sheathed around said first winding frame and said second winding frame of said winding frame member;
    a second three-dimensional conductive piece arranged between said first three-dimensional conductive pieces;
    a magnetic core assembly partially embedded into said first three-dimensional conductive pieces, said first winding frame, said second winding frame and said second three-dimensional conductive piece; and
    a fixing plate connected with said first three-dimensional conductive pieces and said second three-dimensional conductive piece so as to fix said first three-dimensional conductive pieces and said second three-dimensional conductive piece.

2. The transformer according to claim 1 wherein said first winding frame and said second winding frame of said winding frame member are separately arranged.

3. The transformer according to claim 1 wherein said first winding frame and said second winding frame have respective central channel for partially receiving said magnetic core assembly therein.

4. The transformer according to claim 1 wherein each of said first three-dimensional conductive pieces and said second three-dimensional conductive piece is formed by turning a copper slice for multi-loops.

5. The transformer according to claim 1 wherein each of said first three-dimensional conductive pieces comprises a first main body and a first receiving part, and said first winding frame or said second winding frame of said winding frame member is accommodated within said first receiving part.

6. The transformer according to claim 5 wherein each of said first three-dimensional conductive pieces further comprises a first connecting part, and said first connecting part is extended from a first terminal of said first main body and parallel with a length direction of said first receiving part.

7. The transformer according to claim 6 wherein each of said first three-dimensional conductive pieces is turned for multi-loops, every two loops are connected with each other through an intermediate part, which is arranged on the same plane with said first connecting part, and a sidewall of said intermediate part has a slant surface.

8. The transformer according to claim 6 wherein said second three-dimensional conductive piece comprises a second main body and a second receiving part, and said magnetic core assembly are partially embedded into said second receiving part.

9. The transformer according to claim 8 wherein said second three-dimensional conductive piece comprises a third connecting part, which is extended from a first terminal of said second main body and parallel with a length direction of said second receiving part.

10. The transformer according to claim 9 wherein said fixing plate has several perforations corresponding to said first connecting parts of said first three-dimensional conductive pieces and said third connecting part of said second three-dimensional conductive piece, and said first three-dimensional conductive pieces and said second three-dimensional conductive piece are fixed on said fixing plate when said first connecting parts and said third connecting part are inserted into corresponding perforations.

11. The transformer according to claim 6 wherein each of said first three-dimensional conductive pieces further comprises a second connecting part, which is extended horizontally and externally from a second terminal of said first main body.

12. The transformer according to claim 11 wherein said transformer further comprises at least an auxiliary plate for supporting an electronic component thereon.

13. The transformer according to claim 12 wherein said auxiliary plate has several engaging holes corresponding to said second connecting parts of said first three-dimensional conductive pieces, and said auxiliary plate is fixed on said first three-dimensional conductive pieces when said second connecting parts are inserted into corresponding engaging holes.

14. The transformer according to claim 12 wherein said auxiliary plate is made of copper such that said electronic component and said first three-dimensional conductive pieces are electrically connected with each other through said auxiliary plate.

15. The transformer according to claim 9 wherein said second three-dimensional conductive piece further comprises a fourth connecting part, which is extended externally from a second terminal of said second main body.

16. The transformer according to claim 1 wherein said fixing plate is made of copper such that said first three-dimensional conductive pieces and said second three-dimensional conductive piece are electrically connected with each other through said fixing plate.

* * * * *